Dec. 30, 1924.
B. M. W. HANSON
TAP
Filed Jan. 31, 1923
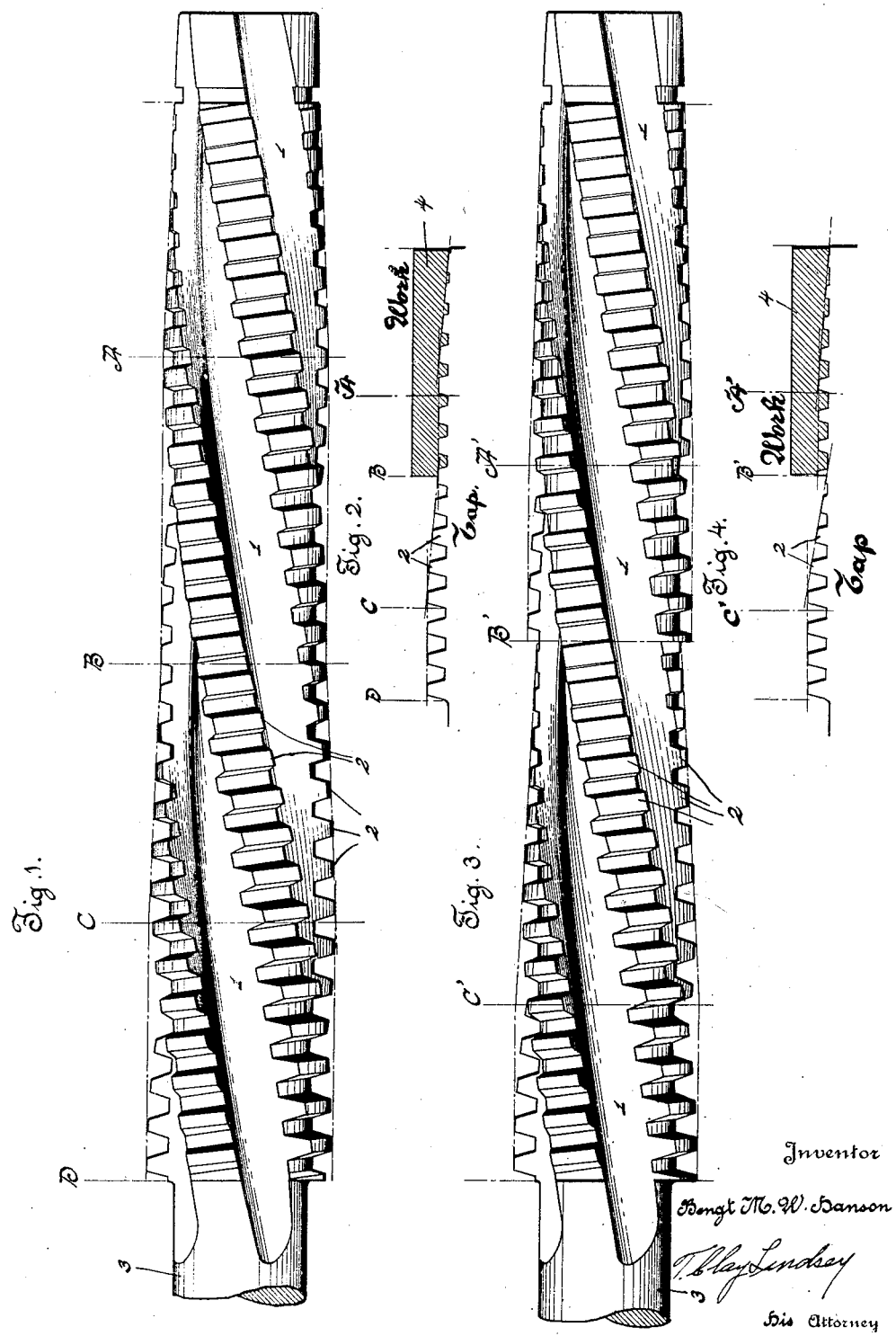

Patented Dec. 30, 1924.

1,520,714

UNITED STATES PATENT OFFICE.

BENGT M. W. HANSON, OF HARTFORD, CONNECTICUT.

TAP.

Application filed January 31, 1923. Serial No. 616,093.

*To all whom it may concern:*

Be it known that I, BENGT M. W. HANSON, a citizen of the United States, and a resident of Hartford, county of Hartford, State of Connecticut, have invented certain new and useful Improvements in Taps, of which the following is a specification.

This invention relates to screw thread cutting devices, and, more particularly, to methods and devices for cutting internal screw threads.

One of the objects of this invention is to provide an improved method for cutting screw threads by which there is produced an internal thread having a fine finish and exceptionally accurate in lead and shape. Another object of the invention is to provide an improved construction for a screw thread cutting tap which is adapted to cut threads of this character, the lead of the teeth on the tap being of precise uniformity throughout.

In cutting threads with the usual form of tap, and, more particularly, when cutting long threads, as, for instance, in holes longer than twice their diameters, it is often found that the tap will not operate smoothly and uniformly because of the relatively large number of teeth which are cutting at the same time, each taking out a chip and these chips bind becoming accumulated in the flutes with the result that the tap will jerk and chatter, causing the cut to be rough and jagged. When threading a relatively long hole with a tap having a tapered portion as long as the hole, considerable resistance and friction are set up because of the many teeth which are cutting simultaneously, and the resultant torque causes the tool to twist with the effect that the lead of the teeth is varied, causing a binding action between the sides of the teeth and the sides of the thread groove being formed in the work. Binding is also caused by inaccuracies in the lead of the tap which are present when made by processes ordinarily employed. It must be borne in mind that a tap when threading an opening acts as a screw and the work acts as a nut, tending to draw the tap into the hole, and if there is any irregularity in the lead of the teeth of the tap, the forward portion of the tap will form a thread of one lead and then, as the remaining portion of the tap goes into the hole, the teeth thereon, owing to the inaccuracies in lead, will have a binding or rubbing action which results in increased friction, excessive strains, faulty operation, and injury to the work and tool.

By my method of making taps, in which the teeth are ground after hardening to correct inaccuracies in lead, the latter cause of binding with its consequent roughening of the thread is eliminated. One method often resorted to for cutting a highly finished thread is to use a roughing tap to cut out part of the material and, thereafter, to use a finishing tap to complete the work. The amount of material removed by the roughing tap is not great enough to crowd the space provided in the flutes and, therefore, a smoother thread is produced. When this process is repeated for a great number of times, it is a very expensive proposition, as there is a great deal of wasted time shifting the work from one tap to the other and, moreover, the work is not particularly well finished, since the thread is not as smooth as it would be if the work were done entirely by one tap.

In the preferred form of the invention, I employ a single tap which may be said to be divided into two integral sections of which the first section is adapted to produce a cut, removing practically one-half the material from the thread and the second of which cuts an equal amount either deepening the first cut or widening and deepening to remove substantially a like amount and to finish the thread. There are thus two thread cutting portions one in each section of the tap and each having cutting teeth at their forward ends. I prefer to use cutting teeth at the forward ends of such sections of the tap and to follow these by non-cutting teeth which serve to guide the cutting teeth in their motion forward, insuring uniformity in the lead, and the non-cutting teeth of the forward section serving to draw the second portion forward into the groove or cut made by the first section for substantially the same object. The flutes between the non-cutting teeth also provide additional space for the chips cut by the cutting teeth on either side and crowding is thereby eliminated.

In the drawing, which illustrates the preferred embodiment of my invention, and in which similar reference characters refer to similar parts:

Fig. 1 is a side view of a tap constructed in accordance with the invention;

Fig. 2 is a diagrammatic showing, somewhat exaggerated, of the tap as shown in Fig. 1;

Fig. 3 is a tap also embodying the features of the invention in an alternate form, and Fig. 4 is a diagrammatic showing of the principle of operation of the tap shown in Fig. 3, the contour being somewhat exaggerated.

Referring to the drawing, and more particularly to Figs. 1 and 2, there is illustrated a tap provided with flutes 1 arranged spirally at an angle of greater than 90° to the lead of the teeth, that is to say the spirality of the flutes is exaggerated so that the forward cutting edge of the teeth 2 is acute producing a self-clearing action for the chips, and a smoother cut. The teeth are arranged in groups, the first group of cutting teeth ending at A and being followed by a non-cutting group of teeth which end at B. Beginning again at B, and extending toward the shank of the tool, there is a second group of cutting teeth which extend as far as C and which are followed by a group of non-cutting teeth up to the point D which, in the present embodiment, is the end of the toothed portion of the tap. A suitable shank 3 is provided for insertion in a chuck or other device for turning the tap. The group of teeth ending at A are tapered in an approved manner and are adapted to cut a thread having a width at the base equal to the width desired in the finished thread, to cut this thread only part of its depth. The group of teeth between A and B follow this thread as cut by the forward end teeth and themselves produce no cutting. The tap is preferably constructed so that the length of the hole in the work, as indicated at 4, shall be not greater than the distance between the forward cutting teeth of the first group up to the point B which marks the beginning of the second group of cutting teeth. The second group of cutting teeth between the points B and C deepen the cut, being drawn into such cut by the non-cutting teeth preceding, and finish the thread to its proper depth. This last group of cutting teeth is also followed by a group of non-cutting teeth between the points C and D which steady the tap as the cutting teeth are finishing the thread. There is also provided, by the flutes between the non-cutting teeth, space for the chips cut by the other teeth.

As before mentioned, the length of the hole should preferably be not greater than the distance from the first cutting tooth of the first group to the first cutting tooth of the second group. In Fig. 2, the length of the hole is shown substantially equal to this distance which is the most economical, and probably the best length. Thus, as the forwardmost cutting tooth leaves the work, the forwardmost cutting tooth of the second cutting group enters the work and as these teeth are designed to cut substantially equal amounts, the power required to turn the tap is substantially the same until the first cutting tooth of the second cutting group emerges from the forward end of the hole in the work 4. Thus, not only is the work of cutting divided up evenly between the two sections of the tap, but the power required to turn the tap is substantially uniform during the cutting or as substantially uniform as can be provided. Such an arrangement makes for very economical operation where there are a large number of such holes to be tapped and also avoids the danger of breakage of the tool which is apt to cause considerable loss of time and expense.

In Fig. 3, there is shown a modification in which the teeth of the first cutting group extending to the point A' cut a groove in the hole which is of a width at the base less than that desired in the finished product. These cutting teeth do not cut the groove to the finished depth but do so more nearly than do the corresponding teeth shown in Fig. 1. The second group of cutting teeth, starting at B', start with their thread diameters very small approximating the root diameter but taper more sharply than do the teeth of the first cutting group ending at A'. The teeth of this second cutting group are tapered to cut chips from the sides of the groove cut by the first cutting teeth somewhat in the form of square increments until they reach the depth cut by the first group of cutting teeth. Thereafter, they cut rectangular increments up to the final depth desired. As in the tap shown in Fig. 1, the second group of cutting teeth ends at C' and is followed by a group of non-cutting teeth which serve as a guide and for steadying the preceding cutting teeth.

Thus, by the above construction, there are accomplished, among others, the objects to which reference has been hereinbefore made.

As many changes could be made in the above construction, and many, apparently, widely different embodiments of this invention could be made without departing from the scope thereof, it is intended that all matter, contained in the above description or shown in the accompanying drawings, shall be interpreted as illustrative and not in a limiting sense.

It is also to be understood that the language used in the following claim is intended to cover all of the generic and specific features of the invention herein described and the statement of the scope of the invention which, as a matter of language, might be said to fall therebetween.

I claim as my invention:

A tap having a first thread cutting portion and a second thread cutting portion for finishing the cut made by the first portion, said second portion being arranged to widen and deepen such cut, the two portions being longitudinally spaced so that the first cutting teeth of such portions are at a distance from each other not less than the length of the hole to be threaded, and non-cutting teeth being interposed between the two thread cutting portions.

BENGT M. W. HANSON.